United States Patent
Xu et al.

(10) Patent No.: US 11,609,792 B2
(45) Date of Patent: Mar. 21, 2023

(54) MAXIMIZING RESOURCE UTILIZATION OF NEURAL NETWORK COMPUTING SYSTEM

(71) Applicant: ALIBABA GROUP HOLDING LIMITED, Grand Cayman (KY)

(72) Inventors: Lingjie Xu, San Mateo, CA (US); Wei Wei, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 1010 days.

(21) Appl. No.: 16/358,547

(22) Filed: Mar. 19, 2019

(65) Prior Publication Data
US 2020/0301739 A1 Sep. 24, 2020

(51) Int. Cl.
*G06F 9/50* (2006.01)
*G06N 3/04* (2023.01)
*G06F 9/48* (2006.01)

(52) U.S. Cl.
CPC ............ *G06F 9/505* (2013.01); *G06F 9/4881* (2013.01); *G06F 9/5044* (2013.01); *G06F 9/5083* (2013.01); *G06N 3/0454* (2013.01)

(58) Field of Classification Search
CPC ...... G06F 9/505; G06F 9/4881; G06F 9/5044; G06F 9/5083; G06N 3/0454; G06N 3/063
See application file for complete search history.

(56) References Cited

U.S. PATENT DOCUMENTS

| | | | |
|---|---|---|---|
| 10,726,330 B2 * | 7/2020 | Ferdman | G06N 3/063 |
| 10,748,057 B1 * | 8/2020 | Li | G06N 3/08 |
| 2019/0050265 A1 * | 2/2019 | Vijayaraghavan | G06F 11/3024 |
| 2019/0114535 A1 * | 4/2019 | Ng | G06N 3/0454 |
| 2019/0147337 A1 * | 5/2019 | Yang | G06N 3/0454 706/25 |
| 2019/0196831 A1 * | 6/2019 | Han | G06F 3/0679 |
| 2021/0141604 A1 * | 5/2021 | Fais | G06N 20/00 |

FOREIGN PATENT DOCUMENTS

| | | | | |
|---|---|---|---|---|
| CN | 105934766 B | * | 11/2018 | G06N 3/0454 |
| DE | 102019200954 A1 | * | 7/2020 | G06N 3/0445 |

* cited by examiner

*Primary Examiner* — Michael A Keller
(74) *Attorney, Agent, or Firm* — Finnegan, Henderson, Farabow, Garrett & Dunner, LLP

(57) ABSTRACT

The present disclosure relates to a method for allocating resources of an accelerator to two or more neural networks for execution. The two or more neural networks may include a first neural network and a second neural network. The method comprises analyzing workloads of the first neural network and the second neural network, wherein the first neural network and second neural network each includes multiple computational layers, evaluating computational resources of the accelerator for executing each computational layer of the first and second neural networks, and scheduling computational resources of the accelerator to execute one computational layer of the multiple computation layers of the first neural network and to execute one or more computational layers of the multiple computational layers of the second neural network.

19 Claims, 12 Drawing Sheets

300

MAXIMIZING RESOURCE UTILIZATION OF NEURAL NETWORK COMPUTING SYSTEM

BACKGROUND

With the emergence of Artificial Intelligence technology, machine learning networks or deep learning networks have been widely deployed in computing devices located in one or more data centers. To meet ever-growing needs for computing power, heterogeneous accelerators having powerful computing capability have been developed. While accelerators are becoming more powerful, their resources are rarely fully utilized as conventionally only one neural network is processed by an accelerator at a time. Accordingly, conventional systems do not efficiently utilize their accelerator resources.

SUMMARY

Embodiments of the present disclosure provide a method comprising analyzing workloads of the first neural network and the second neural network, wherein the first neural network and second neural network each includes multiple computational layers, evaluating computational resources of the accelerator for executing each computational layer of the first and second neural networks, and scheduling computational resources of the accelerator to execute one computational layer of the multiple computation layers of the first neural network and to execute one or more computational layers of the multiple computational layers of the second neural network.

Embodiments of the present disclosure also provide an apparatus comprising a memory storing a set of instructions, and one or more processors configured to execute the set of instructions to cause the apparatus to perform: analyzing workloads of the first neural network and the second neural network, wherein the first neural network and second neural network each includes multiple computational layers, evaluating computational resources of the accelerator for executing each computational layer of the first and second neural networks, and scheduling computational resources of the accelerator to execute one computational layer of the multiple computation layers of the first neural network and to execute one or more computational layers of the multiple computational layers of the second neural network.

Embodiments of the present disclosure also provide a non-transitory computer readable medium that stores a set of instructions that is executable by at least one processor of a computing device to cause the computing device to perform a method comprising analyzing workloads of the first neural network and the second neural network, wherein the first neural network and second neural network each includes multiple computational layers, evaluating computational resources of the accelerator for executing each computational layer of the first and second neural networks, and scheduling computational resources of the accelerator to execute one computational layer of the multiple computation layers of the first neural network and to execute one or more computational layers of the multiple computational layers of the second neural network.

The computational resources of the accelerator can be scheduled to execute the one computational layer of the first neural network and the one or more computational layers of the second neural network before executing another computational layer subsequent to the one computation layer of the first neural network. An execution time for the one computational layer of the first neural network may be shorter than a pipeline interval of the first neural network. Scheduling computational resources can comprise scheduling the computational resources of the accelerator to execute the one or more computational layers of the second neural network during a time period corresponding to a difference between the first pipeline interval and the execution time. Scheduling computational resources can comprise scheduling the computational resources of the accelerator to execute the one or more computational layers of the second neural network before executing the one computational layer of the first neural network.

The method can further comprise comparing a total amount of computational resources for executing the first and second neural networks with a total amount of available computational resources of the accelerator. Here, scheduling computational resources of the accelerator can be performed when the total amount of computational resources for executing the first and second neural networks is bigger than the total amount of computational resources of the accelerator. The method can further comprise determining a time period that the computational resources assigned for executing the first neural network are not used during execution of the first neural network. Here, the one or more computational layers of the second neural network can be executed within the time period. The first neural network can have a longer pipeline interval than the second neural network.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1A:
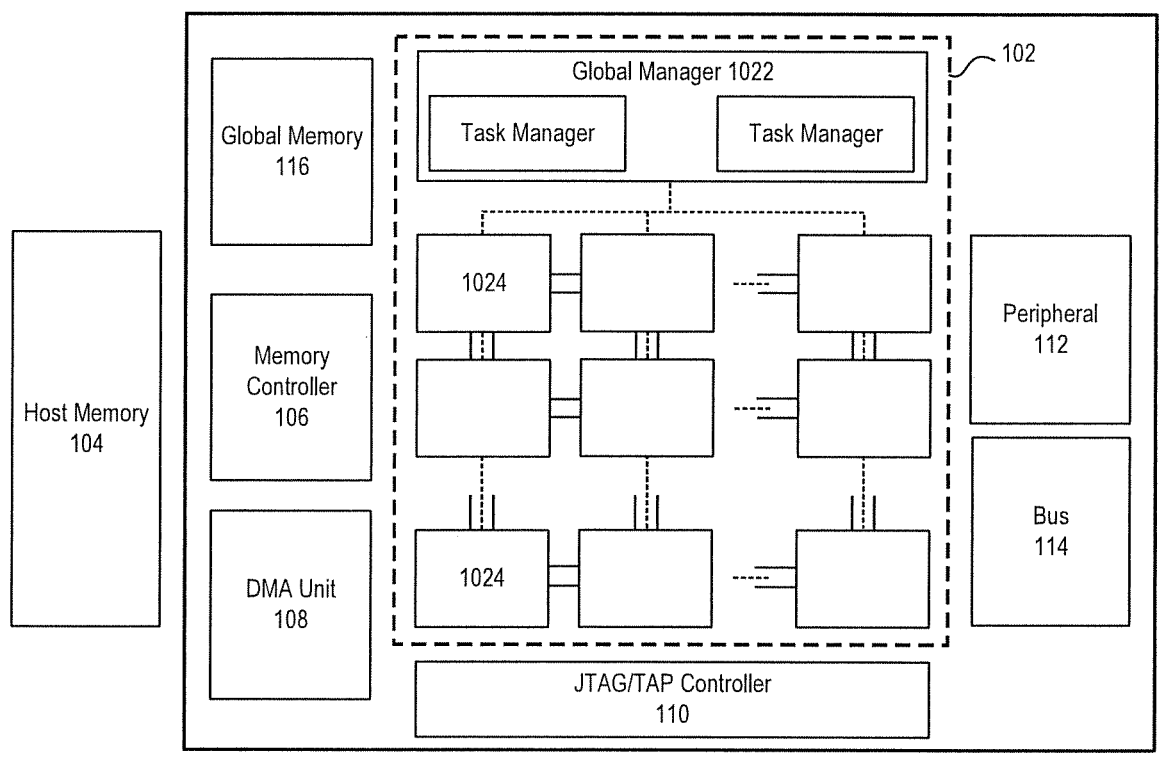
FIG. 1A illustrates an exemplary neural network accelerator architecture, consistent with embodiments of the present disclosure.

FIG. 1A illustrates an exemplary neural network accelerator architecture 100, consistent with embodiments of the present disclosure. In the context of this disclosure, a neural network accelerator may also be referred to as a machine learning accelerator or deep learning accelerator. In some embodiments, accelerator architecture 100 may be referred to as a neural network processing unit (NPU) architecture 100. As shown in FIG. 1A, accelerator architecture 100 can include an on-chip communication system 102, a host memory 104, a memory controller 106, a direct memory access (DMA) unit 108, a Joint Test Action Group (JTAG)/Test Access End (TAP) controller 110, peripheral interface 112, a bus 114, a global memory 116, and the like. It is appreciated that on-chip communication system 102 can perform algorithmic operations based on communicated data. Moreover, accelerator architecture 100 can include a global memory 116 having memory blocks (e.g., 4 blocks of 8 GB second generation of high bandwidth memory (HBM2)) to serve as main memory.

On-chip communication system 102 can include a global manager 1022 and a plurality of cores 1024. Global manager 1022 can include at least one task manager to coordinate with one or more cores 1024. Each task manager can be associated with an array of cores 1024 that provide synapse/neuron circuitry for the neural network. For example, the top layer of cores of FIG. 1A may provide circuitry for executing a first layer of a neural network, while the second layer of cores may provide circuitry for executing a second layer of the neural network. As shown in FIG. 1A, global manager 1022 can include two task managers to coordinate with two arrays of cores 1024.

Cores 1024 can include one or more processing elements that each includes single instruction, multiple data (SIMD) architecture including one or more processing units configured to perform one or more operations (e.g., multiplication, addition, multiply-accumulate, etc.) on the communicated data under the control of global manager 1022. To perform the operation on the communicated data packets, cores 1024 can include one or more processing elements for processing information in the data packets. Each processing element may comprise any number of processing units. In some embodiments, core 1024 can be considered a tile or the like Host memory 104 can be off-chip memory such as a host CPU's memory. For example, host memory 104 can be a double data rate synchronous dynamic random-access memory (e.g., DDR SDRAM) or the like. Host memory 104 can be configured to store a large amount of data with slower access speed, compared to the on-chip memory integrated within one or more processors, acting as a higher-level cache.

Memory controller 106 can manage the reading and writing of data to and from a specific memory block (e.g., HBM2) within global memory 116. For example, memory controller 106 can manage read/write data coming from an external chip communication system 102 (e.g., from DMA unit 108 or a DMA unit corresponding with another accelerator) or from on-chip communication system 102 (e.g., from a local memory in core 1024 via a 2D mesh controlled by a task manager of global manager 1022). Moreover, while one memory controller is shown in FIG. 1A, it is appreciated that more than one memory controller can be provided in accelerator architecture 100. For example, there can be one memory controller for each memory block (e.g., HBM2) within global memory 116.

Memory controller 106 can generate memory addresses and initiate memory read or write cycles. Memory controller 106 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, and/or other typical features of memory controllers.

DMA unit 108 can assist with transferring data between host memory 104 and global memory 116. In addition, DMA unit 108 can assist with transferring data between multiple accelerators. DMA unit 108 can allow off-chip devices to access both on-chip and off-chip memory without causing a host CPU interrupt. Thus, DMA unit 108 can also generate memory addresses and initiate memory read or write cycles. DMA unit 108 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, and/or the number of bytes to transfer in one burst. It is appreciated that accelerator architecture 100 can include a second DMA unit, which can be used to transfer data between other accelerator architecture to allow multiple accelerator architectures to communicate directly without involving the host CPU.

JTAG/TAP controller 110 can specify a dedicated debug port implementing a serial communications interface (e.g., a JTAG interface) for low-overhead access to the accelerator without requiring direct external access to the system address and data buses. JTAG/TAP controller 110 can also have on-chip test access interface (e.g., a TAP interface) that implements a protocol to access a set of test registers that present chip logic levels and device capabilities of various parts.

Peripheral interface 112 (such as a PCIe interface), if present, serves as an (and typically the) inter-chip bus, providing communication between the accelerator and other devices.

Bus 114 includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. Typically, if there is a peripheral interface 112 (e.g., the inter-chip bus), bus 114 is solely concerned with intra-chip buses, though in some implementations it could still be concerned with specialized inter-bus communications.

While accelerator architecture 100 of FIG. 1A is generally directed to an NPU architecture (as further described below), it is appreciated that the disclosed embodiments may be applied to any type of accelerator for accelerating some applications such as deep learning. It is also appreciated that the disclosed embodiments can be applied to any accelerator such as a chip with SIMD architecture. Such accelerators can be, for example, GPU (Graphics Processing Unit), FPGA (Field Programmable Gate Array), ASIC (Application Specific Integrated Circuit) with vector or matrix processing ability, or other types of neural network accelerators for deep learning. SIMD or vector architecture is commonly used to support computing devices with data parallelism, such as graphics processing and deep learning. The SIMD architecture can include multiple processing elements, wherein each of the processing elements can perform the same operation on multiple data points simultaneously.

Figure 1B:
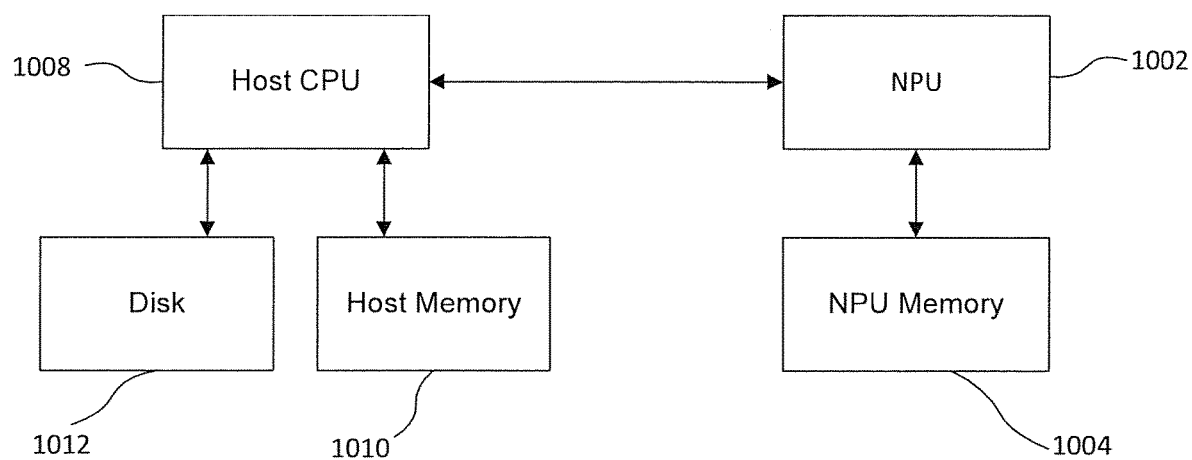
FIG. 1B illustrates an exemplary neural network accelerator system, consistent with embodiments of the present disclosure.

Reference is now made to FIG. 1B, which illustrates a block diagram of an exemplary neural network accelerator system 1000, consistent with embodiments of the present disclosure. Neural network accelerator system 1000 may include a neural network processing unit (NPU) 1002, an NPU memory 1004, a host CPU 1008, a host memory 1010 associated with host CPU 1008 (which may correspond to host memory 104 of FIG. 1A), and a disk 1012.

As illustrated in FIG. 1B, NPU 1002 may be connected to host CPU 1008 through a peripheral interface (e.g., peripheral interface 112 of FIG. 1A). As referred to herein, a neural network processing unit (e.g., NPU 1002) may be a computing device for accelerating neural network computing tasks. In some embodiments, NPU 1002 may be configured to be used as a co-processor of host CPU 1008.

In some embodiments, NPU 1002 may comprise a compiler (not shown). The compiler is a program or computer software that transforms computer code written in one programming language into NPU instructions to create an executable program. In machining applications, a compiler can perform a variety of operations, for example, pre-processing, lexical analysis, parsing, semantic analysis, conversion of input programs to an intermediate representation, code optimization, and code generation, or combinations thereof.

In some embodiments, the compiler may be on a host unit (e.g., host CPU 1008 or host memory 1010 of FIG. 1B), configured to push one or more commands to NPU 1002. Based on these commands, a task manager (e.g., task manager 102 of FIG. 1A) may assign any number of tasks to one or more cores or processing elements (for simplicity, cores shall be referred to hereinafter although the core can include multiple processing elements or be separate from processing elements). Some of the commands may instruct a DMA unit (e.g., DMA unit 108 of FIG. 1A) to load instructions and data from host memory (e.g., host memory 104 of FIG. 1A) into a global memory. The loaded instructions may then be distributed to each core (e.g., core 1024 of FIG. 1A) assigned with the corresponding task, and the one or more cores may process these instructions.

It is appreciated that the first few instructions received by the core may instruct the core to load/store data from the global memory into one or more local memories of the core (e.g., a memory of the core or a local memory for each active core). Each core may then initiate the instruction pipeline, which involves fetching the instruction (e.g., via a fetch unit) from the local memory, decoding the instruction (e.g., via an instruction decoder) and generating local memory addresses (e.g., corresponding to an operand), reading the source data, executing or loading/storing operations, and then writing back results.

Host CPU 1008 may be associated with host memory 1010 and disk 1012. In some embodiments, host memory 1010 may be an integral memory or an external memory associated with host CPU 1008. Host memory 1010 may be a local or a global memory. In some embodiments, disk 1012 may comprise an external memory configured to provide additional memory for host CPU 1008.

Figure 2:
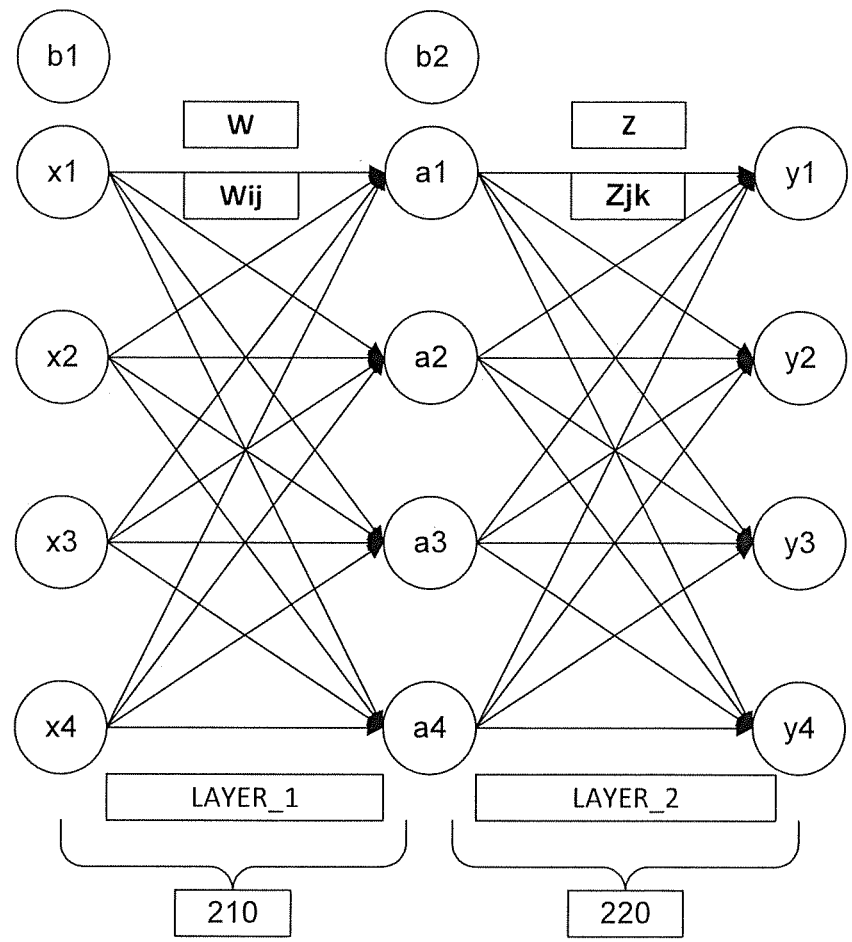
FIG. 2 illustrates an example of a neural network model.

FIG. 2 illustrates an example of a neural network model. In FIG. 2, a neural network 200 with multiple computational layers, for example, layers 210 and 220 is illustrated. In some embodiments, it can be interpreted that the neural network 200 has three layers in that a first row of nodes representing input variables x1 to x4 can be referred to as an input layer, a second row of nodes representing intermediate results a1 to a4 can be referred to as a hidden layer, and a third row of nodes representing results y1 to y4 can be referred to as an output layer. An example of the computation at each computation layer 210 and 220 can be represented as below:

$$A = f(X * W + b1) \tag{Equation 1}$$

$$Y = g(A * Z + b2) \tag{Equation 2}$$

Here, the computational operation of the first layer 210 uses an input matrix X, a weight matrix W, and a bias matrix b1 as input operands and outputs an output matrix A. The computational operation of the second layer 220 uses an output matrix A of the first layer 210, a weight matrix Z, and a bias matrix b2 as input operands and outputs an output matrix Y. The input matrix X includes x1 to x4 as its elements. An element wij of the weight matrix W represents a weight value corresponding to an arrow from an input node xi to an output node aj. The output matrix A of the first layer 210 includes a1 to a4 as its elements and the output matrix Y of the second layer 220 includes y1 to y4 as its elements. "f(•)" and "g(•)" can represent activation functions such as a sigmoid function, etc. Bias matrices b1 and b2 are bias matrices for each layer. The assignment arrows for the bias values b1 and b2 of the bias matrices b1 and b2 are omitted in FIG. 2 for simplicity. It is illustrated that the same bias vector b1 is used for each array in the first layer 210 and the same bias vector 22 is used for each array in the second layer 220 in FIG. 2, but it is appreciated that different bias values can be used for arrays in each layer 210 and 220.

As illustrated above, generally, a neural network can be organized in layers. Each computational layer can perform one or more calculations on its inputs and generate outputs. The outputs of a computational layer can be passed onto a next computational layer for further processing. For example, an output matrix A of the first layer 210 can be an input for the second layer 220. Therefore, after the execution for the first layer 210 is completed, the execution for the second layer 220 can begin. Although FIG. 2 illustrates a neural network with two layers, it is appreciated that the present disclosure can also be applied to deep learning networks with more than two layers.

The neural networks that have more than two layers are called deep neural networks (DNN). A typical number of network layers used in deep learning ranges from five to more than a thousand. Therefore, accelerators placed in a data center (such as an AI ASIC (Artificial Intelligence ASIC)) have become more powerful to include enough resources to accommodate an entire neural network or more than one neural network on chip. When a resource of an accelerator is assigned to a certain layer and needs to wait for operands to arrive from a previous layer, such resource is wasted during the standby period. A typical neural network has a plurality of layers, and an execution time for each of the plurality of layers is usually different from each other. Therefore, a considerable amount of resources on chip of accelerators are idling and waiting for input operands to arrive from a previous computational layer and are thereby wasted for such a time period. This lowers the on-chip resource utilization of accelerators and thus degrades overall throughput of the accelerators.

The disclosed embodiments provide methods and apparatuses for increasing resource utilization rate on accelerators and thus improving overall throughput of the accelerators. The disclosed embodiments provide resource recycling techniques for assigning on chip resources to two or more neural networks. The disclosed embodiments provide methods and apparatuses for allocating computational resources of an accelerator for a time period that the computational resources are in an idle mode in executing a first neural network to a second neural network. The disclosed embodiments provide a computational resource sharing technique of an accelerator between two or more neural networks. The disclosed embodiments also provide methods and apparatus for sharing a computational resource between two or more neural network, each having a layer comprising an operation common to the two or more neural network.

Figure 3:
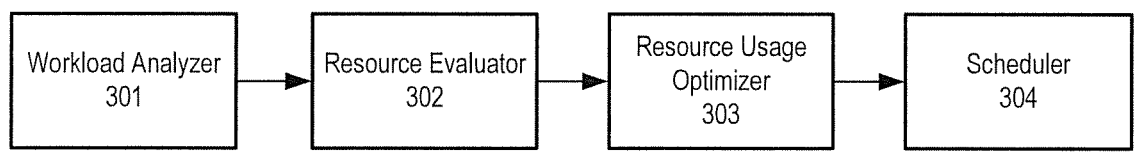
FIG. 3 illustrates a block diagram of a resource allocation apparatus, consistent with embodiments of the present disclosure.

FIG. 3 illustrates a block diagram of a resource allocation apparatus, consistent with embodiments of the present disclosure. As shown in FIG. 3, resource allocation apparatus 300 can include a workload analyzer 301, a resource evaluator 302, a resource usage optimizer 303, and a scheduler 304. In some embodiments, the resource allocation apparatus 300 can be implemented within a compiler. In some embodiments, at least one component of the resource allocation apparatus 300 of FIG. 3 can be implemented within a compiler.

Workload analyzer 301 receives two or more neural networks to be processed by an accelerator. Here, an accelerator can be designed for executing a neural network and may have, for example, the accelerator architecture 100 of FIG. 1A. Workload analyzer 301 can determine an amount of resources for executing each neural network of the received two or more neural networks. In some embodiments, workload analyzer 301 may determine how much computational resources are needed for the neural network layer by layer.

Figure 4:
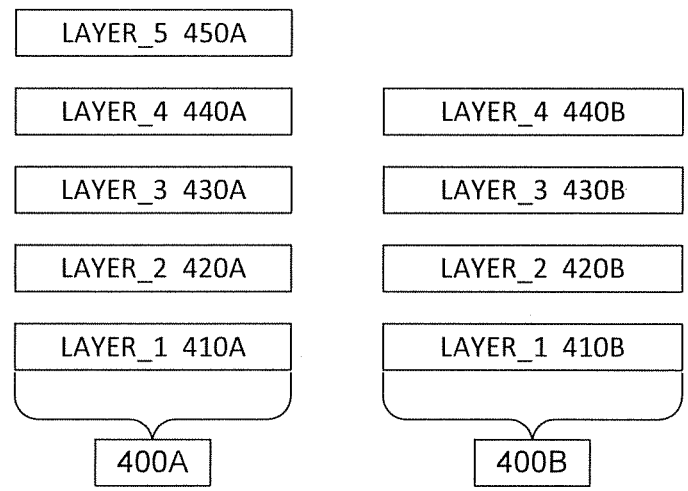
FIG. 4 illustrates a first neural network and a second neural network as an example for input neural networks for a resource allocation apparatus shown in FIG. 3.

Functions of the workload analyzer 301 as well as the resource allocation apparatus 300 will be further described. For example, FIG. 4 illustrates a first neural network 400A and a second neural network 400B as an example for input neural networks for a resource allocation apparatus 300 shown in FIG. 3. A first neural network 400A includes five computational layers 410A to 450A and a second neural network 400B includes four computational layers 410B to 440B. Referring back to FIG. 3, workload analyzer 301 receives the first neural network 400A and second neural network 400B and determines the resources needed to execute each of the first neural network 400A and second neural network 400B. Here, the resources needed to execute the first neural network 400A and second neural network 400B can be determined layer by layer.

In some embodiments, the workload analyzer 301 or the resource allocation apparatus 300 may have full knowledge about the specification of the accelerator. In some embodiments, the workload analyzer 301 or the resource allocation apparatus 300 may be able to access information about the specification of the accelerator. For example, the workload analyzer 301 or the resource allocation apparatus 300 may access a database storing the information about the specification of the accelerator. The specification of the accelerator may comprise available computational resources such as the number of cores, processing elements, memory capability, input and output terminals, and so on. In some embodiments, the workload analyzer 301 may refer to a database for resource usage for executing each layer of input neural networks on a target accelerator. For example, the workload analyzer 301 may use the resource usage information prestored in the database. In some embodiments, the workload analyzer 301 or the resource allocation apparatus 300 may run each of the input neural networks on the target accelerator beforehand and store results thereof in the database. In some embodiments, the workload analyzer 301 may calculate resource usage to execute each layer of input neural networks on a target accelerator on demand. The information about specifications of the accelerator and the resource usage of each layer of input neural networks can be further used in resource evaluator 302. Here, the information about the resource usage may include an amount of resources used for executing each layer of input neural networks and corresponding execution time to complete for executing each layer of the input neural networks.

Figure 5A:
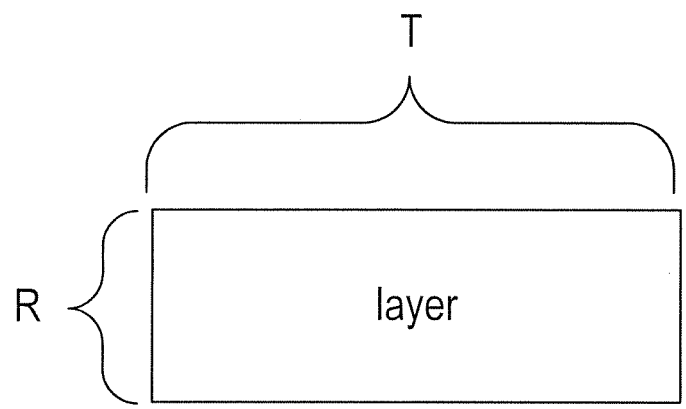
FIGS. 5A-5F illustrates an example for a resource allocation method, consistent with embodiments of the present disclosure.

Given a certain layer of a neural network and a certain specification of an accelerator, computational resources of the accelerator can be assigned to process the certain layer as a function of factors including time T to complete and resources R needed, consistent with embodiments of the present disclosure. It is understood that there is a trade-off between the time T to complete and resources R needed. Generally, if the more resources are assigned to process a certain layer, the time T to complete for the certain layer reduces. When the minimum time T is reached, adding more resources for the certain layer would not reduce the time T to complete any more. For understanding purpose of the present disclosure, the time T to complete and resources R needed for a certain layer can be represented as shown in FIG. 5A. That is, a height of the layer can represent the amount of resources R needed for executing the layer and a width of the layer can represent the time T to complete the execution of the layer with the assigned resources R. The height of the layer can become higher when the amount of resources increases or lower when resources are decreased. The width of the layer can become wider when the execution time to complete increases or narrower when the execution time is decreased.

Figure 5B:
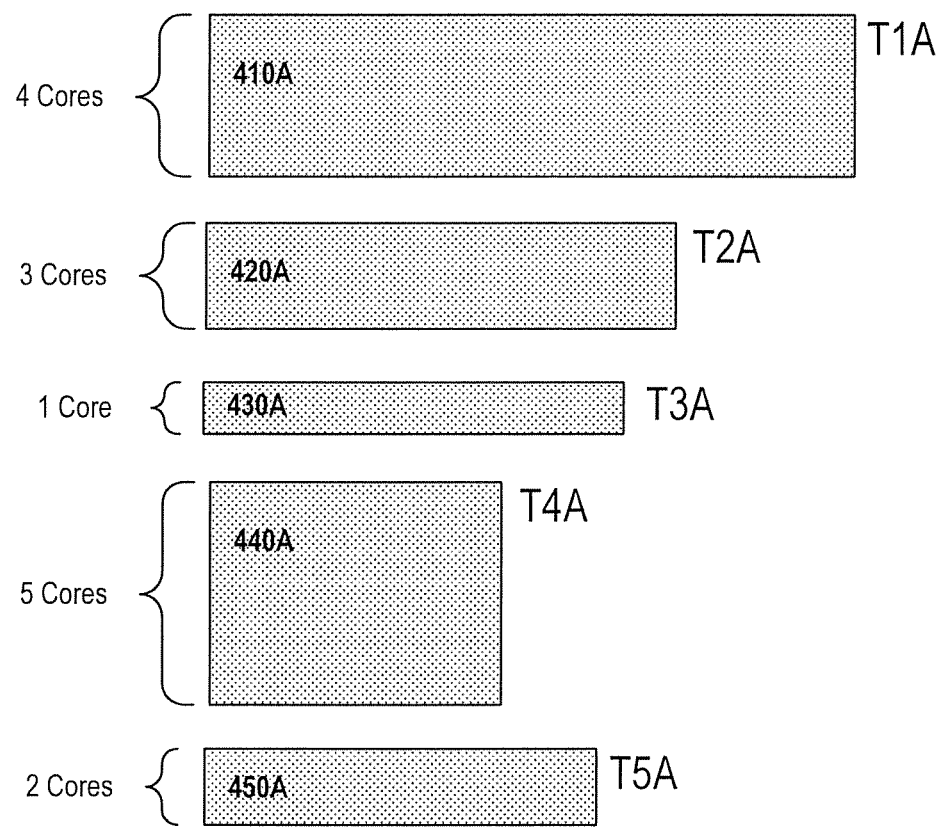

As illustrated above, the resources of the accelerator to be assigned to a neural network may include various computational resources such as cores, processing elements, memory, input and output terminals, and so on. Therefore, the resources R can have a plurality of dimensions in embodiments of the present disclosure. For simplicity, embodiments of the present disclosure are illustrated only considering the number of cores as computational resources R to be assigned. FIG. 5B illustrates an example of the number of cores needed to process and corresponding time to complete for each layer of a first neural network 400A, which is determined by the workload analyzer 301. For example, four cores of an accelerator are used to execute a first layer 410A of the first neural network 400A. Three cores of the accelerator are used to execute a second layer 420A of the first neural network 400A. Similarly, the numbers of cores for executing third to fifth layers 430A to 450A are illustrated in FIG. 5B. In total, 15 cores are used to process a first neural network 400A in this example.

Still referring to FIG. 5B, it will take a time T1A to complete the execution for the first layer 410A, and a time T2A to complete the execution for the second layer 420A. Similarly, it will take times T3A, T4A, and T5A to complete execution for third to fifth layers 430A to 450A as shown in FIG. 5B. An output of the first layer 410A is produced every T1A time. Although the accelerator can execute the second layer 420A for a time T2A, an output of the second layer 420A is produced every T1A time since the execution of the second layer 420A cannot begin again until the output of the first layer 410A is provided to the second layer 420A. Considering each layer as a pipeline stage, then a pipeline interval can be defined by a longest time to complete among the times to complete for each layer. In FIG. 5B, the time T1A is longest among the times T1A to T5A to complete layers 410A to 450A of a first neural network 400A. If it is assumed that each layer is fully pipelined, each layer can produce its output every T1A time and the first neural network 400A can produce its output result every T1A time.

Therefore, the first neural network can produce its final output every cycle of the pipeline interval T1A. For example, if the first neural network 400A is used for image recognition and the execution of the first neural network is fully pipelined, each layer processes one image every T1A time and then passes its output to a next layer.

Figure 5C:
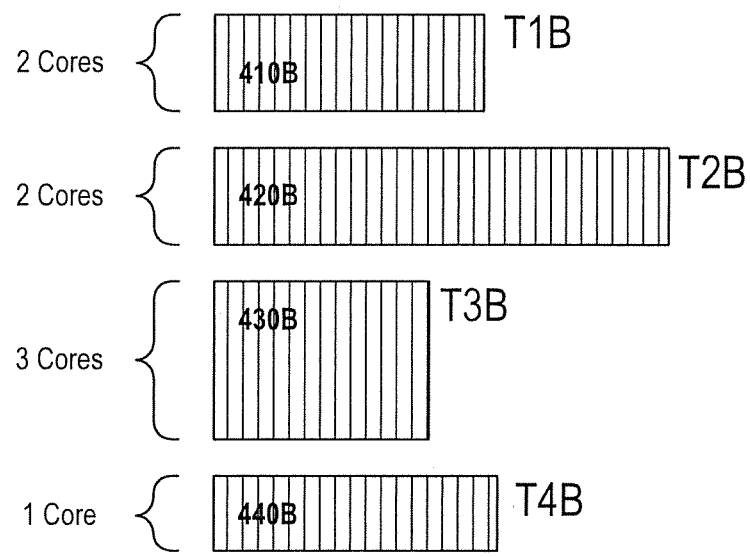

FIG. 5C illustrates an example of the number of cores to be used to process and corresponding time to complete for each layer of a second neural network 400B, which is determined by the workload analyzer 301. For example, two cores of an accelerator can be used to execute a first layer 420B of the second neural network 400B. Similarly, the numbers of cores used to execute second to fourth layers 420B to 440B are illustrated in FIG. 5C. In total, 8 cores are used to process a second neural network 400B. Also shown in FIG. 5C, it will take a time T1B to complete the execution of the first layer 410B, and a time T2B to complete the execution of the second layer 420B. Similarly, it will take times T3B and T4B to complete execution for third and fourth layers 430B and 440B as shown in FIG. 5C. For the second neural network 400B, a pipeline interval can be determined as a time T2B in that the time T2B is longest among the times T1B to T4B. If it is assumed that each layer is fully pipelined, each layer can produce its output every T2B time, and the second neural network 400B can produce its output result every T2B time after the first cycle of execution for whole layers 410B to 440B is completed.

Referring back to FIG. 3, resource evaluator 302 determines total resources to be used to process the received two or more neural networks, and compares the determined total resources to process the received two or more neural networks with total available resources of an accelerator. The comparison result can be provided to a resource usage optimizer 303. In some embodiments, if the total resources used to process the received two or more neural network are equal to or less than the total available resources of the accelerator, the comparison result can be directly provided to a scheduler 304. For example, the total resources to process the first neural network 400A and second neural network 400B can be determined as 23 cores. If the accelerator includes 23 cores or more, the result may be forwarded to the scheduler 304 without going through the resource usage optimizer 303. In this case, the scheduler 304 can schedule the received two or more neural networks to be executed by its own computational resources on the accelerator. That is, the two or more neural networks can share the accelerator but do not share the same computational resources (such as the cores) for execution. If the accelerator includes less than 23 cores, the result may be forwarded to the resource usage optimizer 303. For example, if the accelerator includes 20 cores, the accelerator conventionally cannot be used for executing the first neural network 400A and second neural network 400B concurrently.

Resource usage optimizer 303 optimizes resource allocation for the received two or more neural networks, consistent with embodiments of the present disclosure. Resource usage optimizer 303 determines wasted resources and time periods of the waste for the received two or more neural networks. In some embodiments, the wasted resources and time periods of the waste can be first determined for a primary neural network among the received two or more neural networks. For example, the primary neural network can be a neural network having a longer pipeline interval than other neural networks, the primary neural network can be a neural network that is most latency sensitive among the received two or more neural networks, or the primary neural network can be a neural network requiring more cores than other neural networks. The first neural network 400A is used as a primary neural network in FIG. 5D as an example.

Figure 5D:
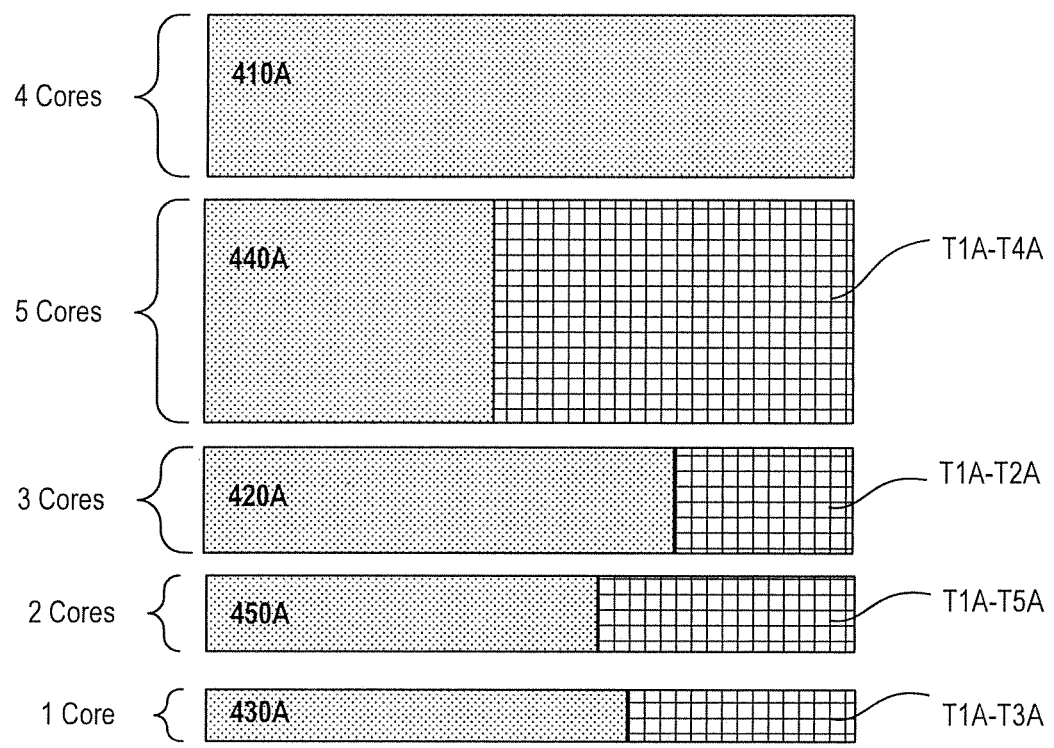

As shown in FIG. 5D the resource usage optimizer 303 may sort the layers in order of an amount of resources used, consistent with embodiments of the present disclosure. In some embodiments, a layer having the pipeline interval, here a first layer 410A, can be placed on top of the order. It is appreciated that data still flows from $N^{th}$ layer to $N+1^{th}$ layer and the sorting of the layers is performed for optimizing resource allocation in an accelerator. In FIG. 5D, five cores assigned to a fourth layer 440A are wasted for a time period (T1A-T4A) to wait for results of the third layer 430A to arrive during a pipeline interval and indicated as a check pattern, three cores assigned to a second layer 420A are wasted for a time period (T1A-T2A) during a pipeline interval and indicated as a check pattern. Similarly, wasted time periods for cores assigned to a fifth layer 450A and a third layer 430A are illustrated in FIG. 5D.

According to embodiments of the present disclosure, the wasted resources can be recycled by assigning the resources to another neural network during the wasted time period. For example, the resource usage optimizer 303 can assign layers 410B to 440B of the second neural network 400B to the resources already assigned to the layers 410A to 450A of the first neural network 400A during a time period that the resources are wasted or in an idle mode.

Figure 5E:
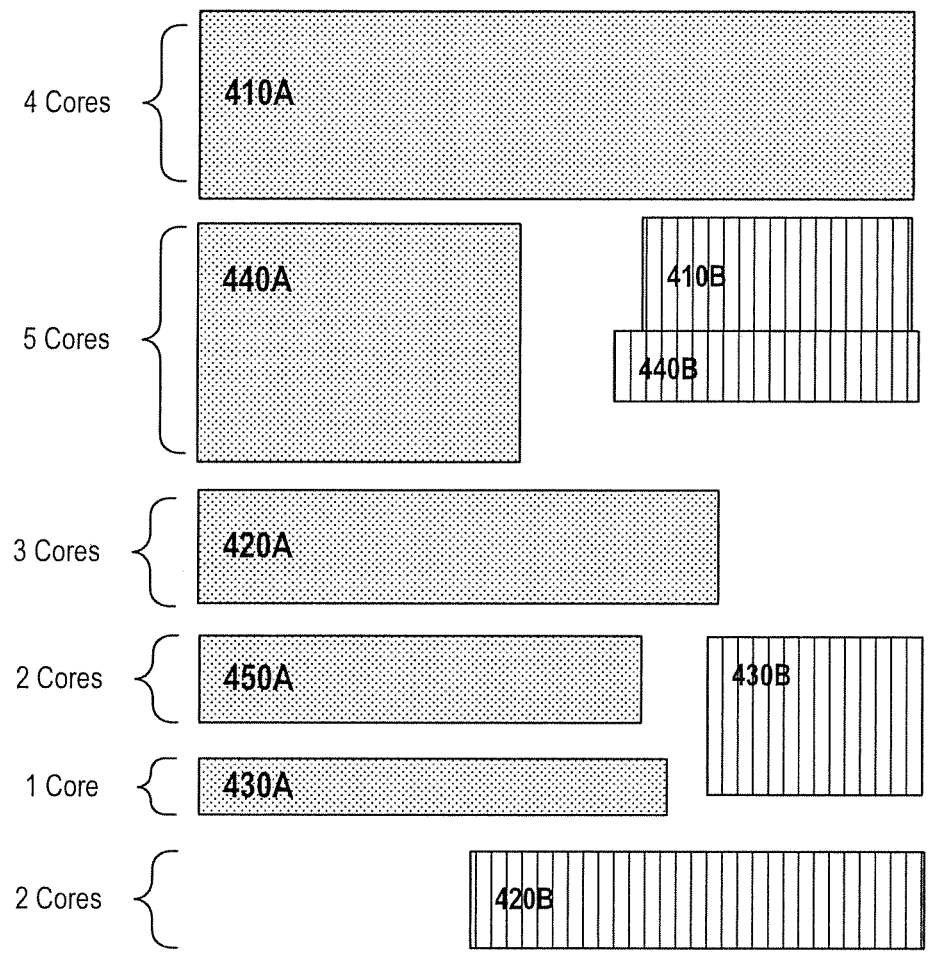

In some embodiments, the resource usage optimizer 303 may start assigning a layer requiring the most resources to the wasted resources. Here, the third layer 430B of the second neural network 400B requires the most resources, for example, three cores as shown FIG. 5C. Therefore, the resource usage optimizer 303 starts with assigning the third layer 430B among the layers 410B to 440B of the second neural network 400B to the resources of an accelerator. The resource usage optimizer 303 determines wasted areas in FIG. 5D, in which the resources R (here, 3 cores) and time T3B of the third layer 430B can fit. The third layer 430B can fit into both of one area defined by the resources assigned to the fourth layer 440A of the first neural network 400A and a wasted time period T1A-T4B, and another area defined by the resources assigned to the third and fifth layers 430A and 450A and wasted time periods T1A-T3A and T1A-T5A. As shown in FIG. 5E, the third layer 430B of the second neural network 400B is assigned to the resources assigned to the third and fifth layers 430A and 450A and wasted time periods T1A-T3A and T1A-T5A since efficiency of on-chip resource usage of the accelerator can be more improved when assigning the resources assigned to the fourth layer 440A of the first neural network 400A to the first and fourth layers 410B and 440B of the second neural network 400B. In some embodiments, such a selection can be made by using a greedy algorithm.

Then, the resource usage optimizer 303 determines where the second layer 420B of the second neural network 400B fits among the wasted areas, for example, shown in FIG. 5D. The time T2B to complete execution of the second layer 420B is longer than the time T1B of the first layer 410B while both of the first layer 410B and the second layer 420B require two cores. Therefore, the resource usage optimizer 303 may consider the second layer 420B before the first layer 410B, since the characteristics for the second layer 420B are stricter than that of the first layer 410B. As shown in FIG. 5E, the second layer 420B of the second neural network 400B is assigned to new two cores since the second layer 420B does not fit into any of the wasted area in FIG. 5D. Then, the resource usage optimizer 303 assigns the first layer 410B and fourth layer 440B of the second neural network 400B to the wasted resources assigned to the fourth layer 440A of the first neural network 400A.

Figure 5F:
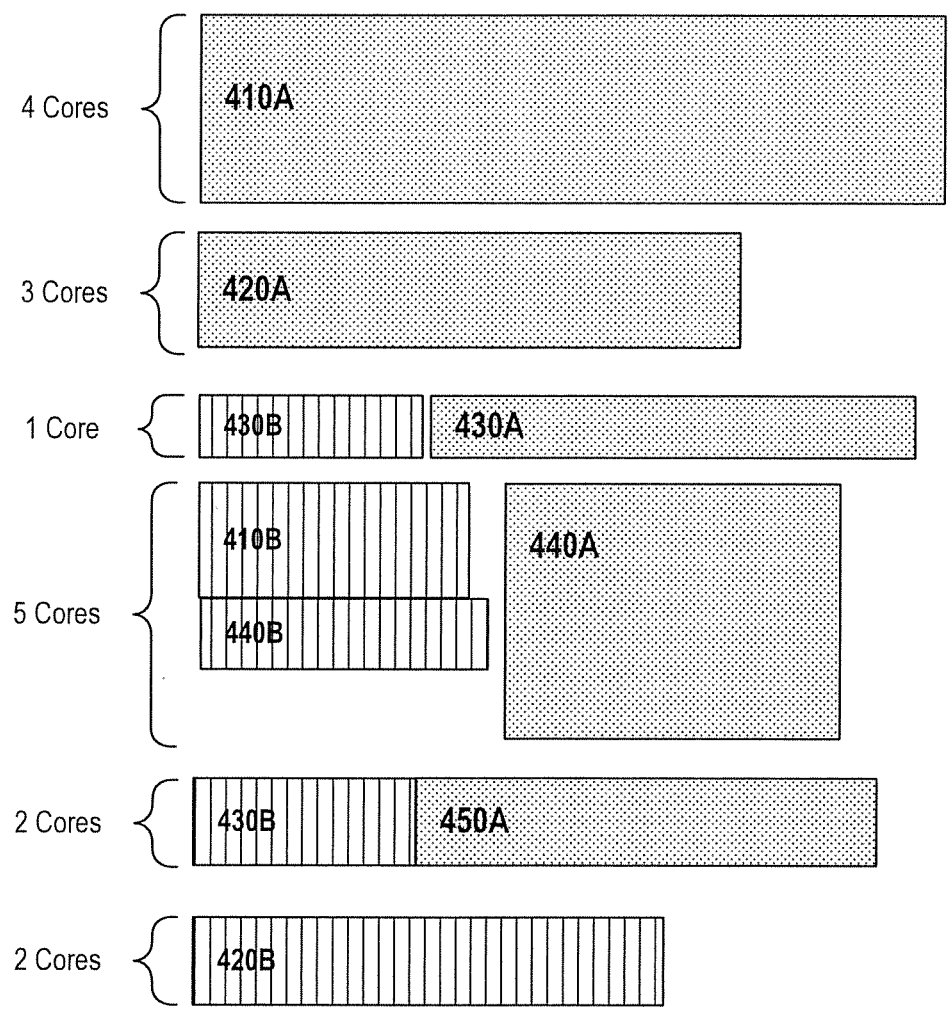

As shown in FIG. 5F, the resource usage optimizer 303 can assign at least a part of the computational resources of the accelerator to concurrently execute two or more neural networks. For example, a certain resource can be assigned to process two or more neural networks in a time divisional manner. It is noted that only 17 cores are used to process both of the first neural network 400A and the second neural network 400B after the optimization by the resource usage optimizer 303 while, without the optimization, 23 cores are used to independently process the first neural network 400A and second neural network 400B. If an accelerator includes only 20 cores on-chip, the first neural network 400A and the second neural network 400B can be concurrently processed in the accelerator according to embodiments of the present disclosure. Otherwise the first neural network 400A and the second neural network 400B should be processed in two different accelerators or should be sequentially in one accelerator. In this example, the resource usage optimization can save three cores on the accelerator, and the three cores can be used for other tasks.

The resource usage optimizer 303 may re-sort the layers of the primary neural network, for example, the layers 410A to 450A of the first neural network 400A in order. FIG. 5F shows a re-sorted resource sharing view. In some embodiments, when re-sorting the layers, the layers from a neural network having a shorter pipeline interval among the received two or more neural network can be positioned before the layers of the other neural networks. In this example, as shown in FIG. 5B and FIG. 5C, the second neural network 400B has a shorter pipeline interval than the first neural network 400A, therefore the layers of the second neural network 400B are positioned before the layers of the first neural network 400A. For example, the third layer 430B of the second neural network 400B is positioned before the third layer 430A of the first neural network 400A with regard to the one shared core as shown in FIG. 5F. Similarly, the first layer 410B of the second neural network 400B is positioned before the fourth layer 440A of the first neural network 400A. In this way, latency impact on the second neural network 400B by sharing resources can be alleviated. In this example, a pipeline interval for the second neural network can be considered as a summation of two execution times T3B and T3A, which is shorter than a first pipeline interval T1A but still longer than original second pipeline interval.

Moreover, as shown from FIG. 5F, the layers 410B to 440B of the second neural network 400B may not be processed in order and thus the processing of the second neural network 400B would experience longer latency. For example, during a first cycle of execution for layers 410A to 450A of the first neural network 400A, the third layer 430B of the second neural network 400B next to the third layer 430A of the first neural network 400A may not be executed because no prior layer (e.g., first and second layers 410B and 420B) of the second neural network 400B has been executed. It means that some of input operands to be used for executing the third layer 430B have not been provided yet. In this example, during a first cycle of execution for the first neural network 400A, the first layer 410B of the second neural network 400B can be executed and the output of the first layer 410B can be provided to the second layer 420B of the second neural network 400B. Similarly, during the first cycle of execution, the second layer 420B of the second neural network 400B can be executed and the output of the second layer 420B can be provided for executing the third layer 430B of the second neural network during a second cycle of execution. That is, execution of the third layer 430B of the second neural network 400B may begin after the first cycle of execution for the first neural network 400A is completed, and the third layer 430B of the second neural network 400B is provided with its input operands from execution of the previous layer such as the second layer 420B. Therefore, the execution of the second neural network 400B is delayed at least for some initial cycles to obtain each layer's input operands from execution of the corresponding previous layers. In some embodiments, it would be preferable that the second neural network 400B is less sensitive in latency than the first neural network 400A.

It is also noted from FIG. 5F that the computational resources assigned to the third layer 430A and fifth layer 450A of the first neural network 400A are both assigned to the third layer 430B of the second neural network 400B. In this case, for each cycle of execution, a part of the third layer 430B of the second neural network 400B is executed first by one core assigned to the third layer 430A of the first neural network 400A, and the rest of the third layer 430B of the second neural network 400B is executed later by two cores assigned to the fifth layer 450B of the first neural network 400A. Therefore, execution of the fourth layer 440B of the second neural network 400B may begin only after receiving outputs of the third layer 430B from two different times.

In some embodiments, when the optimization result by the resource usage optimizer 303 shows that the received two or more neural networks cannot be concurrently processed, then the resource usage optimizer 303 can abort the process. In some embodiments, the resource usage optimizer 303 may return to a user or system and suggest to drop one neural network among the received two or more neural networks. In some embodiments, the system may continue resource usage optimization after dropping one neural network among the received two or more neural networks.

Referring back to FIG. 3, scheduler 304 schedules the received two or more neural networks for concurrent execution on an accelerator based on the optimization result by the resource usage optimizer 303, consistent with embodiments of the present disclosure. For example, based on the FIG. 5F, the scheduler 304 can assign first core to fourth core (total four cores) to the first layer 410A of the first neural network 400A, fifth cores to seventh cores (total three cores) to the second layer 420A of the first neural network 400A. Similarly, specific resources of the accelerator can be assigned to specific layers of the first neural network 400A.

The scheduler 304 can also align an order of tasks according to the optimization result by the resource usage optimizer 303. For example, the scheduler 304 is configured to schedule the processing of first layer 410A of the first neural network 400A, the results of which are then provided to second layer 420A, and then the second layer 420A is processed, and so on. The scheduler 304 is also configured to align the execution of the two layers from different neural networks in a time divisional manner. For example, the scheduler 304 may schedule execution of the first layer 410B of the second neural network 400B and of the fourth layer 440A of the first neural network 400A by the shared two cores. For concurrent execution of the first layer 410B and the fourth layer 440A during one cycle of execution, a set of instructions for scheduling the first and second neural networks 400A and 400B on the accelerator by the scheduler 304 may include instructions below:

i1: LOAD DATA FOR A FIRST LAYER 410B;
i2: PROCESS A FIRST LAYER 410B;

i3: SAVE RESULT DATA FROM A FIRST LAYER 410B OR PROVIDE RESULT DATA FOR A SECOND LAYER 420B;
i4: LOAD DATA FOR A FOURTH LAYER 440A;
i5: PROCESS A FOURTH LAYER 440A;
i6: SAVE RESULT DATA FROM A FOURTH LAYER 440A OR PROVIDE RESULT DATA FOR A FIFTH LAYER 450A.

In the above instructions, the order of the third instruction i3 and fourth instruction i4 may be reversed according to embodiments. It is appreciated that whole scheduling for concurrently executing the first neural network 400A and second neural network 400B can be performed in a similar manner. While a resource allocation apparatus 300 has been illustrated regarding two neural networks such as a first and second neural networks 400A and 400B as inputs, it is understood that embodiments of the present disclosure can be applied to scenarios involving three or more neural networks as inputs. Resource sharing among three or more neural networks on an accelerator can be performed in a similar way described above according to embodiments of the present disclosure. In some embodiments, a resource allocation apparatus 300 may be implemented within a compiler. In some embodiments, a resource allocation apparatus 300 may be implemented in runtime libraries.

In some embodiments, when the total resources needed to process the received two or more neural network are equal to or less than the total available resources of the accelerator, the comparison result can be directly provided to a scheduler 304. For example, the total resources needed to process the first neural network 400A and second neural network 400B can be determined as 23 cores. If the accelerator includes 23 cores or more, the result may be forwarded to the scheduler 304 directly without going through the resource usage optimizer 303. In his case, the scheduler 304 can schedule the received two or more neural networks to be executed by its own computational resources on the accelerator. For example, the scheduler 304 can assign first to seventeenth cores to the first neural network 400A and eighteenth to twenty third cores to the second neural network 400B for execution. Although the two or more neural networks do not share the same computational resources, the two or more neural networks can share the same accelerator at the same time.

Embodiments of the present disclosure can be applied to existing accelerators in that embodiments of the present disclosure can be implemented with a minimal hardware support. For example, the hardware may support embodiments of the present disclosure by providing a context identifier for each of neural networks concurrently executed on an accelerator to avoid confusion. Embodiments of the present disclosure can also be applied when two or more neural networks have a common layer having the same or similar computational operations. In this case, computational resources can be shared by the two or more neural networks for executing the same computational operations from each of the two or more neural networks. For example, when each of two or more neural networks includes a matrix multiplication operation and a computational resource of the accelerator designed for execution for a matrix multiplication, the computational resource can be shared by the two or more neural network for executing the computational layer of the matrix multiplication. Sharing the same computational resources can be performed in a time divisional manner.

Figure 6:
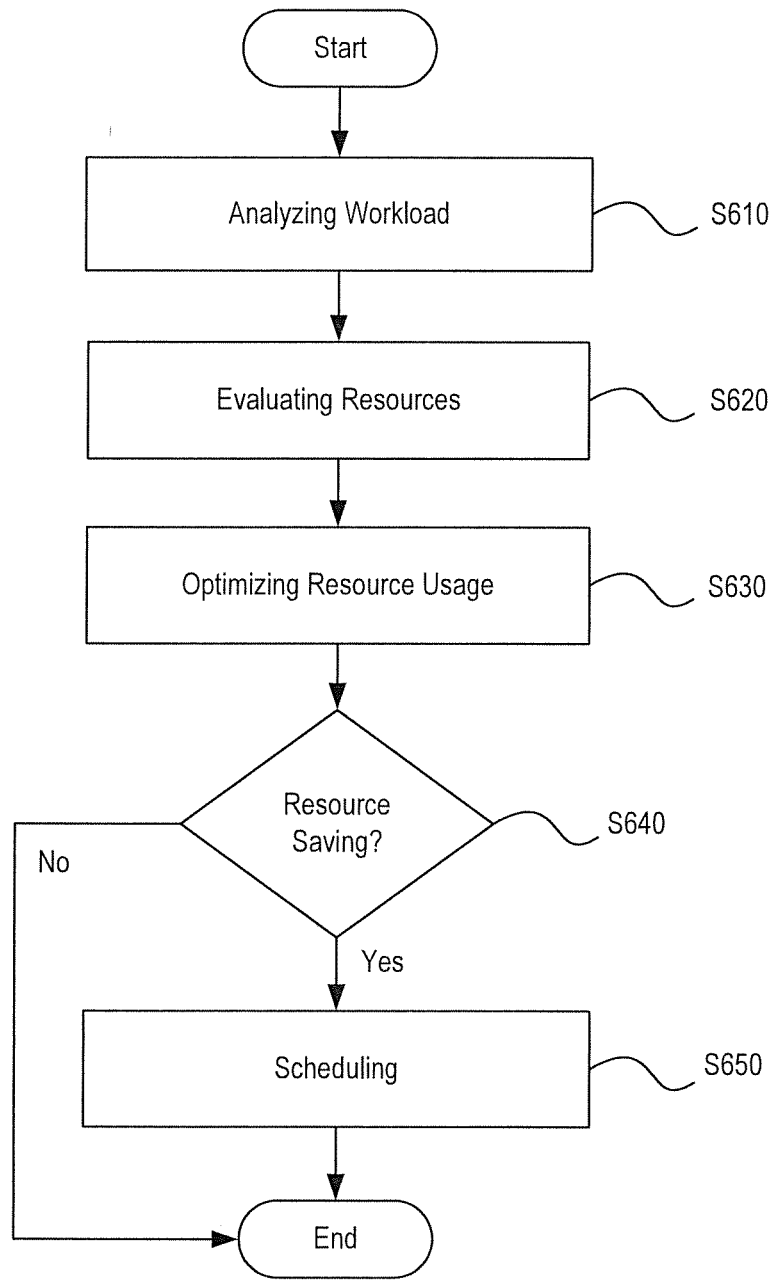
FIG. 6 illustrates an exemplary flow diagram of a resource allocation method, consistent with embodiments of the present disclosure.

FIG. 6 illustrates an exemplary flow diagram of a resource allocation method, consistent with embodiments of the present disclosure. A method for allocating resources of an accelerator may comprise assigning one or more computational resources of the accelerator for executing one or more operations of the first neural network, and assigning at least a part of the one or more computational resources for executing one or more operations of the second neural network for a time period that the at least a part of the one or more computational resources is in an idle mode for executing the one or more operations of the first neural network. Here, a resource allocation method is explained by using a first neural network 400A and a second neural network 400B of FIG. 4 as inputs for a purpose of understanding. In some embodiments, the resource allocation method can be performed by a compiler. In some embodiments, at least one step of the resource allocation method can be performed by a compiler.

At step S610, an amount of resources for executing each neural network of received two or more neural networks is analyzed. In some embodiments, how much computational resources are needed for executing the neural network can be determined layer by layer. The resources of the accelerator to be assigned to a neural network may include various computational resources such as cores, processing elements, memory, input and output terminals, and so on. For purposes of simplicity, embodiments of the present disclosure are described with respect to the number of cores as computational resources R to be assigned. As shown in FIG. 5B and FIG. 5C, the number of cores needed and time to execute each layer of the first and second neural networks can be determined.

At step S620, the total resources needed to process the received two or more neural networks are determined, and the determined total resources needed to process the received two or more neural networks are compared with the total available resources of an accelerator. The comparison result can be provided to step S630. In some embodiments, if the total resources needed to process the received two or more neural network are equal to or less than the total available resources of the accelerator, the process may proceed to step S650. For example, the total resources needed to process the first neural network 400A and second neural network 400B is 23 cores. If the accelerator includes 23 cores or more, the result may be forwarded to step S650 without going through step 630.

At step 630, resource allocation for the received two or more neural networks can be optimized. Wasted resources and time periods of the waste for the received two or more neural networks can be determined. In some embodiments, the wasted resources and time periods of the waste can be first determined for a primary neural network among the received two or more neural networks. For example, the primary neural network can be a neural network having a longer pipeline interval than other neural networks, the primary neural network can be a neural network that is most latency sensitive among the received two or more neural networks, or the primary neural network can be a neural network requiring more cores than other neural networks. The first neural network 400A is used as a primary neural network as an example.

Referring to FIG. 5D. the layers may be sorted in order of an amount of resources used, consistent with embodiments of the present disclosure. In some embodiments, a layer having the pipelined interval, here a first layer 410A, can be placed on top of the order. It is appreciated that data still flows from $N^{th}$ layer to $N+1^{th}$ layer and the sorting of the layers is performed for optimizing resource allocation in an accelerator.

In some embodiments, the optimization may start assigning a layer requiring the most resources to the wasted resources. Here, the third layer 430B of the second neural network 400B requires the most resources, for example, three cores as shown in FIG. 5C. Wasted areas in FIG. 5D, in which the resources R (here, 3 cores) and time T3B of the third layer 430B fits, can be determined. As shown in FIG. 5E, the third layer 430B of the second neural network 400B is assigned to the resources assigned to the third and fifth layers 430A and 450A and wasted time periods T1A-T3A and T1A-T5A. In some embodiments, such a selection can be made by using a greedy algorithm. In this way, the rest of layers of the second neural network 400B can be assigned to wasted areas, for example, shown in FIG. 5D. In some embodiments, priority of assigning the layers of the second neural network 400B can be determined by considering execution times for each layer. For example, the second layer 420B can be assigned to wasted areas before the fourth layer 440B As shown in FIG. 5E, at least a part of the computational resources of the accelerator can be assigned to concurrently execute two or more neural networks. For example, a certain resource can be assigned to process two or more neural networks in a time divisional manner. In some embodiments, the layers of the primary neural network, for example, the layers 410A to 450A of the first neural network 400A can be re-sorted in order. FIG. 5F shows a re-sorted resource sharing view. In some embodiments, when re-sorting the layers, the layers from a neural network having a shorter pipeline interval among the received two or more neural network can be positioned before the layers of the other neural networks.

At step S640, it is determined the received two or more neural networks can be concurrently processed in an accelerator to maximize resource usage. If not, then the process can be terminated. In some embodiments, a corresponding notice can be forwarded to a user or system, suggesting that one neural network among the received two or more neural networks be dropped. In some embodiments, the process may continue with resource usage optimization after dropping one neural network among the received two or more neural networks.

On the other hand, if concurrent processing of the multiple neural network can lead to maximizing resource usage, the process proceeds to step S650. At step S650, the received two or more neural networks can be scheduled for concurrent execution on an accelerator based on the optimization result at step S630, consistent with embodiments of the present disclosure. For example, specific resources of the accelerator can be assigned to specific layers of the first neural networks. An order of tasks according to the optimization result at step S630 can also be aligned. The execution of the two layers from different neural networks can also be aligned in a time divisional manner. For example, execution of the first layer 410B of the second neural network 400B and of the fourth layer 440A of the first neural network 400A by the shared two cores can be aligned in a time divisional manner during a first pipeline interval.

In some embodiments, if it is determined at step S620 that the total resources used to process the received two or more neural network are equal to or less than the total available resources of the accelerator, the process may proceed to step S650. In this case, the received two or more neural networks can be scheduled to be executed by its own computational resources on the accelerator. For example, first to seventeenth cores can be assigned to the first neural network 400A and eighteenth to twenty third cores can be assigned to the second neural network 400B for execution. Although the two or more neural networks do not share the same computational resources, the two or more neural networks can share the same accelerator at the same time.

Embodiments herein include database systems, methods, and tangible non-transitory computer-readable media. The methods may be executed, for example, by at least one processor that receives instructions from a tangible non-transitory computer-readable storage medium. Similarly, systems consistent with the present disclosure may include at least one processor and memory, and the memory may be a tangible non-transitory computer-readable storage medium. As used herein, a tangible non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, registers, caches, and any other known physical storage medium. Singular terms, such as "memory" and "computer-readable storage medium," may additionally refer to multiple structures, such a plurality of memories or computer-readable storage media. As referred to herein, a "memory" may comprise any type of computer-readable storage medium unless otherwise specified. A computer-readable storage medium may store instructions for execution by at least one processor, including instructions for causing the processor to perform steps or stages consistent with embodiments herein. Additionally, one or more computer-readable storage media may be utilized in implementing a computer-implemented method. The term "computer-readable storage medium" should be understood to include tangible items and exclude carrier waves and transient signals.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The invention claimed is:

1. A method comprising:
analyzing workloads of a first neural network and a second neural network, wherein the first neural network and second neural network each includes multiple computational layers;
evaluating computational resources of an accelerator for executing each computational layer of the first and second neural networks; and
scheduling computational resources of the accelerator to execute one computational layer of the multiple computation layers of the first neural network and to execute one or more computational layers of the multiple computational layers of the second neural network, wherein scheduling computational resources of the accelerator is performed when a total amount of computational resources for executing the first and second neural networks is bigger than a total amount of computational resources of the accelerator.

2. The method of claim 1, wherein the first neural network has a first pipeline interval,
wherein an execution time for the one computational layer of the first neural network is shorter than the first pipeline interval, and
wherein scheduling computational resources comprises: scheduling the computational resources of the accelerator to execute the one or more computational layers of the second neural network during a time period corresponding to a difference between the first pipeline interval and the execution time.

3. The method of claim 1, wherein scheduling computational resources comprises: scheduling the computational resources of the accelerator to execute the one or more computational layers of the second neural network before executing the one computational layer of the first neural network.

4. The method of claim 1, wherein evaluating computation resources of the accelerator further comprises: comparing the total amount of computational resources for executing the first and second neural networks with the total amount of available computational resources of the accelerator.

5. The method of claim 1, further comprising:
determining a time period that the computational resources assigned for executing the first neural network are not used during execution of the first neural network,
wherein the one or more computational layers of the second neural network are executed within the time period.

6. The method of claim 1, wherein the first neural network has a longer pipeline interval than the second neural network.

7. The method of claim 1, wherein the computational resources of the accelerator are scheduled to execute the one computational layer of the first neural network and the one or more computational layers of the second neural network before executing another computational layer subsequent to the one computation layer of the first neural network.

8. An apparatus comprising:
a memory storing a set of instructions; and
one or more processors configured to execute the set of instructions to cause the apparatus to perform:
analyzing workloads of a first neural network and a second neural network, wherein the first neural network and second neural network each includes multiple computational layers;
evaluating computational resources of an accelerator for executing each computational layer of the first and second neural networks; and
scheduling computational resources of the accelerator to execute one computational layer of the multiple computation layers of the first neural network and to execute one or more computational layers of the multiple computational layers of the second neural network, wherein scheduling computational resources of the accelerator is performed when a total amount of computational resources for executing the first and second neural networks is bigger than a total amount of computational resources of the accelerator.

9. The apparatus of claim 8, wherein the first neural network has a first pipeline interval,
wherein an execution time for the one computational layer of the first neural network is shorter than the first pipeline interval, and
wherein scheduling computational resources comprises: scheduling the computational resources of the accelerator to execute the one or more computational layers of the second neural network during a time period corresponding to a difference between the first pipeline interval and the execution time.

10. The apparatus of claim 8, wherein scheduling computational resources comprises: scheduling the computational resources of the accelerator to execute the one or more computational layers of the second neural network before executing the one computational layer of the first neural network.

11. The apparatus of claim 8, wherein evaluating computation resources of the accelerator further comprises: comparing the total amount of computational resources for executing the first and second neural networks with the total amount of available computational resources of the accelerator.

12. The apparatus of claim 8, wherein the one or more processors are configured to execute the set of instructions to cause the apparatus to further perform:
determining a time period that the computational resources assigned for executing the first neural network are not used during execution of the first neural network,
wherein the one or more computational layers of the second neural network are executed within the time period.

13. The apparatus of claim 8, wherein the first neural network has a longer pipeline interval than the second neural network.

14. A non-transitory computer readable medium that stores a set of instructions that is executable by at least one processor of a computing device to cause the computing device to perform a method comprising:
analyzing workloads of a first neural network and a second neural network, wherein the first neural network and second neural network each includes multiple computational layers;
evaluating computational resources of an accelerator for executing each computational layer of the first and second neural networks; and
scheduling computational resources of the accelerator to execute one computational layer of the multiple computation layers of the first neural network and to execute one or more computational layers of the multiple computational layers of the second neural network, wherein scheduling computational resources of the accelerator is performed when a total amount of computational resources for executing the first and second neural networks is bigger than a total amount of computational resources of the accelerator.

15. The computer readable medium of claim 14, wherein the first neural network has a first pipeline interval,
wherein an execution time for the one computational layer of the first neural network is shorter than the first pipeline interval, and
wherein scheduling computational resources comprises: scheduling the computational resources of the accelerator to execute the one or more computational layers of the second neural network during a time period corresponding to a difference between the first pipeline interval and the execution time.

16. The computer readable medium of claim 14, wherein scheduling computational resources comprises: scheduling the computational resources of the accelerator to execute the one or more computational layers of the second neural network before executing the one computational layer of the first neural network.

17. The computer readable medium of claim 14, wherein evaluating computation resources of the accelerator further comprises: comparing the total amount of computational resources for executing the first and second neural networks with the total amount of available computational resources of the accelerator.

18. The computer readable medium of claim 14, wherein the set of instructions that is executable by at least one processor of the computing device to cause the computing device to further perform:
  determining a time period that the computational resources assigned for executing the first neural network are not used during execution of the first neural network,
  wherein the one or more computational layers of the second neural network are executed within the time period.

19. The computer readable medium of claim 14, wherein the first neural network has a longer pipeline interval than the second neural network.

* * * * *